United States Patent
Kamel et al.

[11] Patent Number: 5,875,300
[45] Date of Patent: Feb. 23, 1999

[54] CELL LOSS REDUCTION IN A VIDEO SERVER WITH ATM BACKBONE NETWORK

[75] Inventors: Ibrahim Kamel, Alexandria, Egypt; Rafael Alonso, Cranbury, N.J.

[73] Assignee: Matsushita Electric Industrial Co., Ltd., Osaka, Japan

[21] Appl. No.: 791,112

[22] Filed: Jan. 30, 1997

[51] Int. Cl.$^6$ .................................................. H04N 7/173
[52] U.S. Cl. ........................... 395/200.49; 348/7; 455/4.2
[58] Field of Search ......................... 395/200.49, 200.48, 395/200.47; 348/7, 12, 13; 455/4.2, 5.1; 370/229, 230, 235, 237, 395, 428, 398; H04N 7/16, 7/173

[56] References Cited

U.S. PATENT DOCUMENTS

| | | | |
|---|---|---|---|
| 5,610,841 | 3/1997 | Tanaka et al. | 348/12 |
| 5,717,854 | 2/1998 | Egawa et al. | 348/7 |
| 5,756,280 | 5/1998 | Soora et al. | 348/7 |
| 5,771,435 | 6/1998 | Brown | 348/7 |

*Primary Examiner*—Chris Grant
*Attorney, Agent, or Firm*—Harness, Dickey & Pierce, P.L.C.

[57] ABSTRACT

A data organization scheme for movies stored on a video server. The method utilizes the available bandwidth and space in the I/O system to avoid the data contention in the ATM. Basically, parts of the hot movies are replicated on the server unit. Most of the requests to the hot movie are directed to this unit. But if the server unit can not deliver the required video object within the required time limit (because of the large queue length) the video object is transported from the other server units through the ATM network. All the requests that are fulfilled locally by the server unit will not go through the network. Thus, the traffic through the ATM decreases on the expense of increasing the disk utilization.

3 Claims, 6 Drawing Sheets

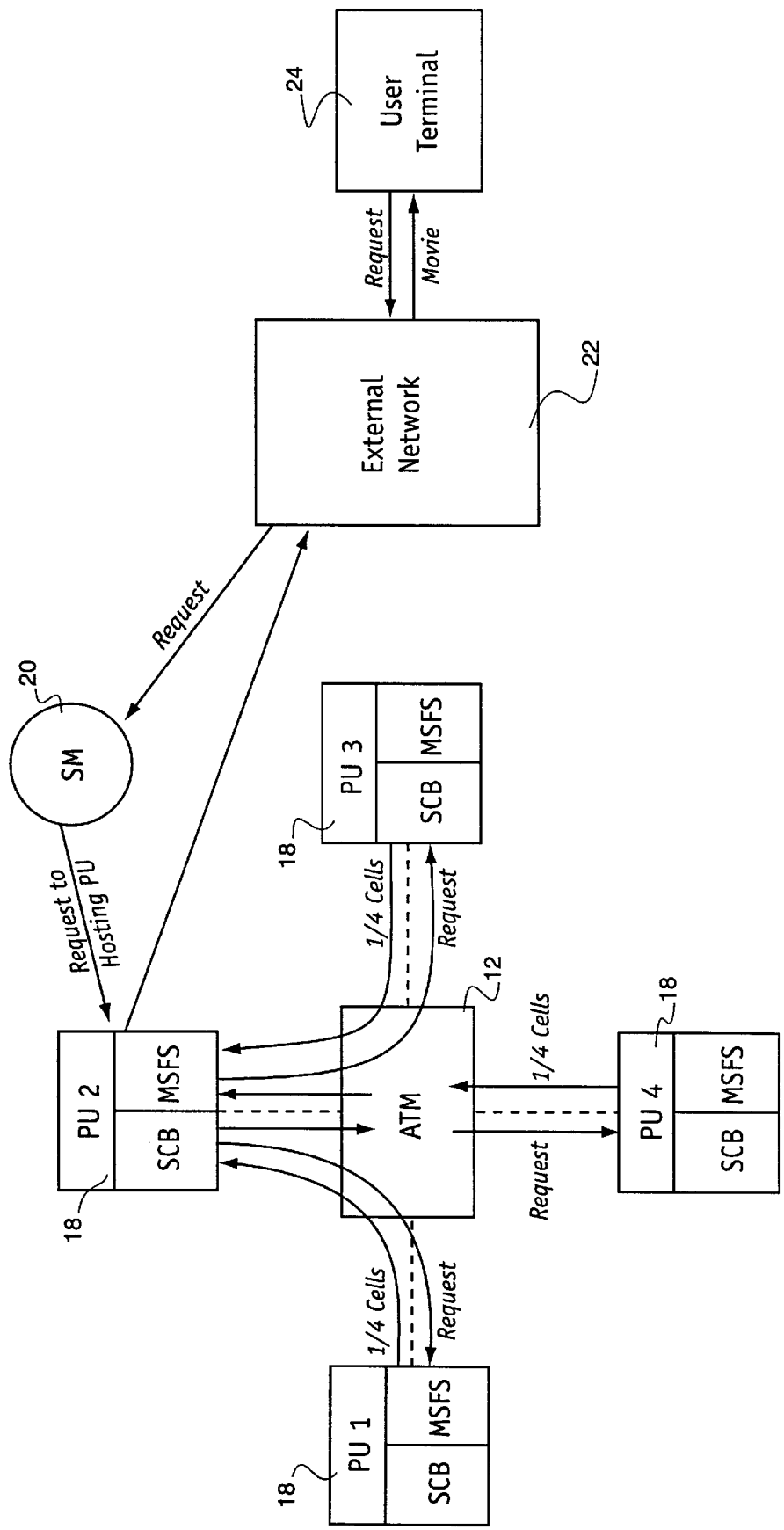
Figure 3
*Conventional*

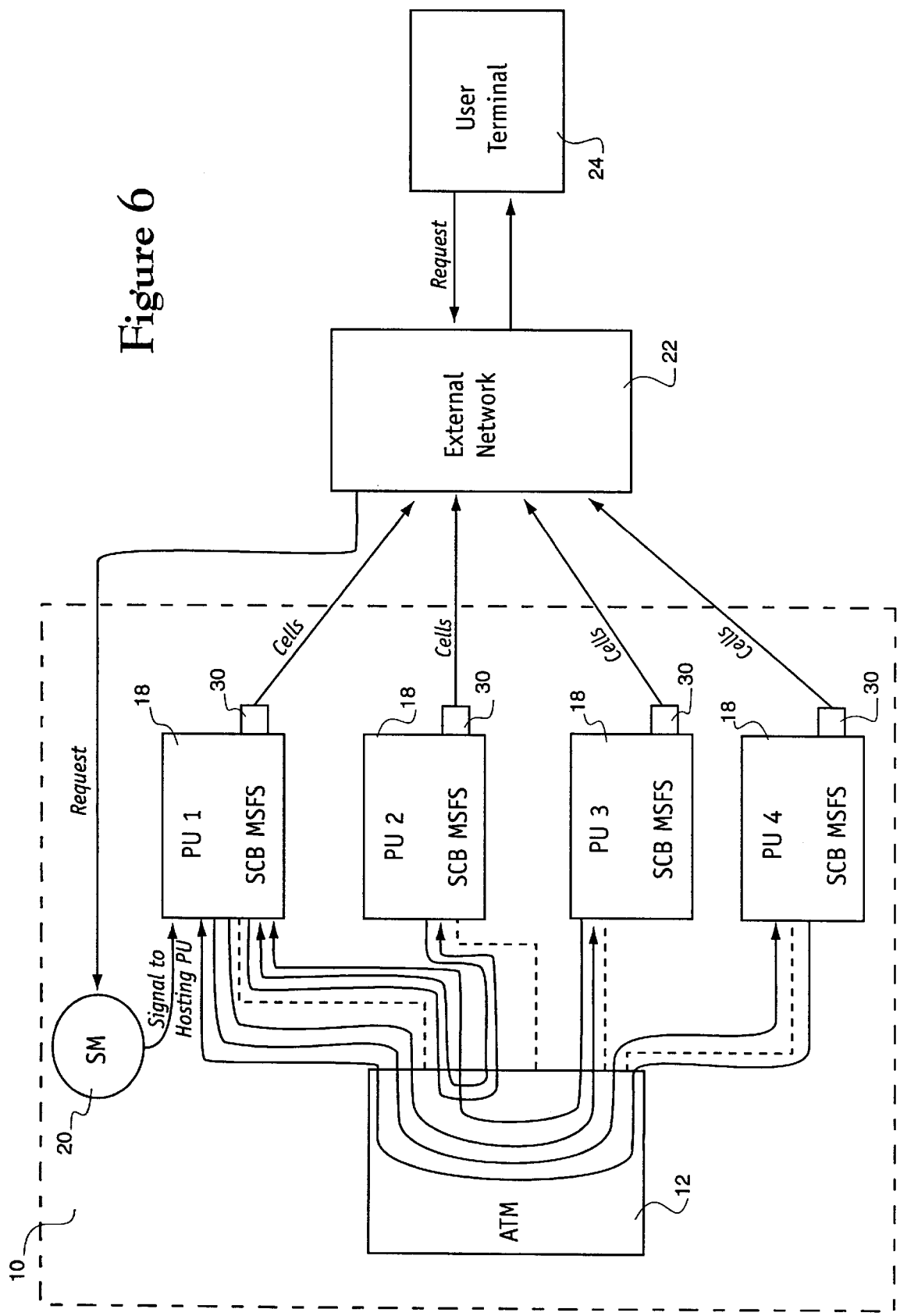

CELL LOSS REDUCTION IN A VIDEO SERVER WITH ATM BACKBONE NETWORK

BACKGROUND OF THE INVENTION

1. Field of the Invention

The present invention relates to a data organization scheme for movies stored on a video server, and more particularly, a data organization scheme to reduce cell losses in a video server with an asynchronous transfer mode (ATM) backbone network.

2. Description of Background Art

Video-on-demand and video authoring tools are emerging as very interesting and challenging multimedia applications. They require special hardware and networking protocols that can accommodate the real-time demands of these applications as well as the high bandwidth that they need.

Several video server architectures have been proposed for handling video-on-demand applications. The focus of the present invention is on an architecture proposed in "A Video Server Using ATM Switching Technology", Y. Ito and T. Tanaka, In The 5th International Workshop on Multimedia Communication, pages 341–346, May 1994, that uses multiple disks and file servers that are internally connected by an ATM network. The architecture described in the above publication is employed in the PanaViSS II™ video server. A challenge faced by the current systems is that system congestion can cause cell losses which reduce the quality of a movie displayed for a client. Simulation studies for the PanaViSS II™ video server have shown that the asynchronous transfer mode (ATM) switch was responsible for most of the cell losses due to traffic congestion.

SUMMARY OF THE INVENTION

Accordingly, it is an object of the present invention to provide an organization scheme to reduce the cell loses at the ATM due to traffic congestion.

It is another object of the present invention to provide an organization scheme which can be easily updated to compensate for new hot movies added to the video server.

These and other objects of the present invention are obtained by providing a video server, comprising: an ATM backbone network; a system manager; and a plurality of units each including a media segment file server and a sequence control broker; wherein each movie stored in said video server is divided into video objects which are stored on each of the units and wherein movies which are determined to be popular movies are also stored to one of said plurality of units such that a number of cells passing through said ATM backbone network is reduced.

The objects of the present invention are also obtained by providing a video server, comprising: an ATM backbone network; a system manager; and a plurality of units each including a media segment file server and a sequence control broker; wherein each movie stored in said video server is divided into video objects which are stored on each of the units and wherein movies which are determined to be popular movies also have a large portion stored to one of said plurality of units such that a number of cells, corresponding to said popular movie, passing through said ATM backbone network is reduced.

The present invention provides a data replication scheme that aims to reduce data congestion on the ATM network. The basic idea is to assign a preferred storage unit for some video objects (hereinafter "movies") that are frequently accessed and replicate parts of these movies on the corresponding preferred unit. On a best effort basis the present invention attempts to fulfill the requests for a movie from its preferred unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitative of the present invention, and wherein:

FIG. 3 is a data flow diagram of the conventional video server architecture shown in FIG. 1;

FIG. 6 is a data flow diagram of the replication scheme according to a third embodiment of the present invention.

DETAILED DESCRIPTION OF THE PREFERRED EMBODIMENTS

Figure 1:
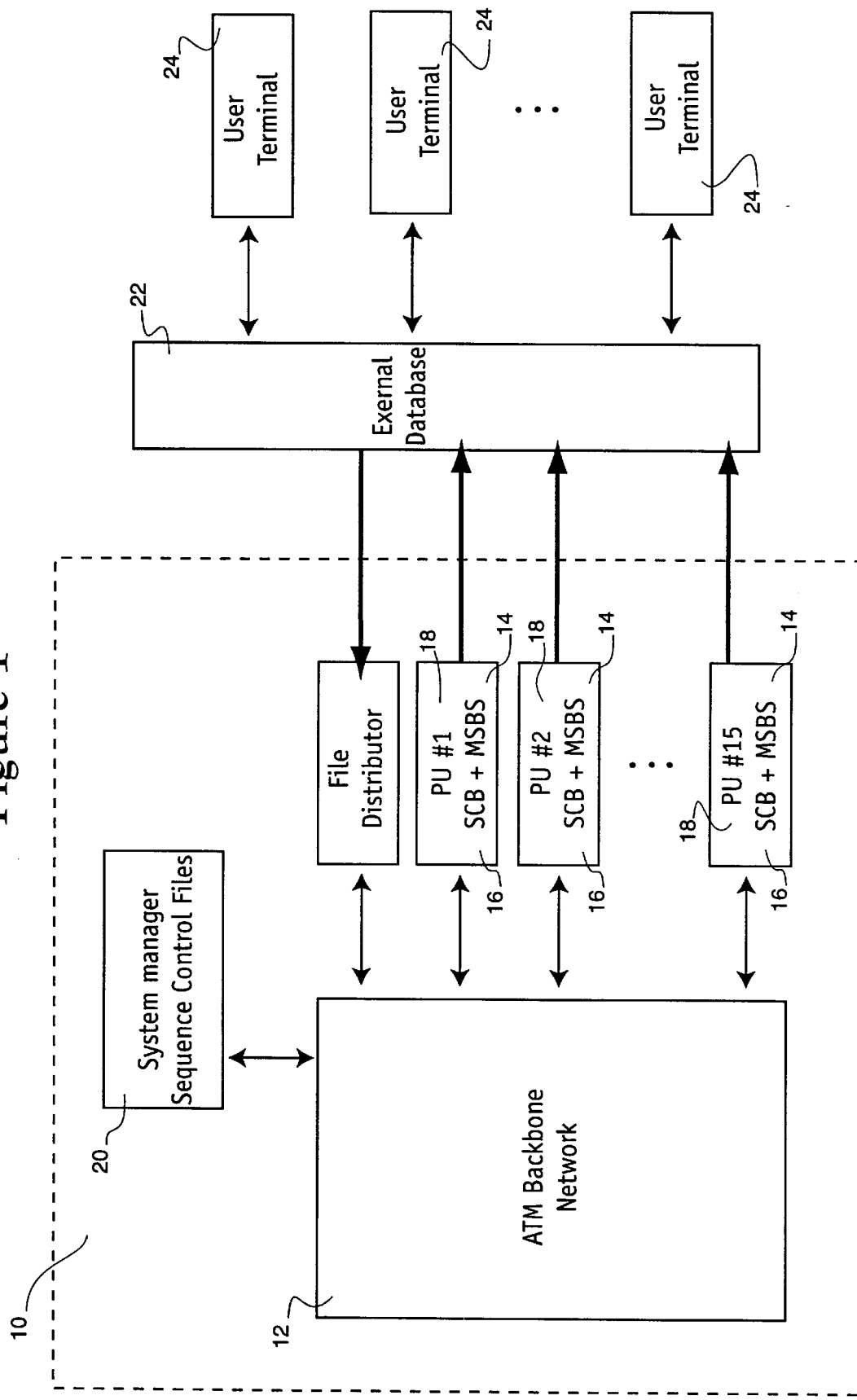
FIG. 1 is a schematic diagram of the architecture of a present video server.

The main components of the system architecture are shown in FIG. 1. The PanaVISS II™ video server 10 consists of several building blocks that are connected through an ATM backbone network 12. The PanaVISS II video server combines a Media Segment File Server (MSFS) 14 and a Sequence Control Broker (SCB) 16 into one unit called PanaVISS Unit (PU) 18. In the current system, there are fifteen PUs 18. In each PU18, the Media Segment File Servers (MSFS) 14 store the video objects and the Sequence Control Brokers (SCB) 16 control the reading of the video objects from the MSFSs 14 and supplying data to users.

A System Manager (SM) 20 is provided as the database server. In the current design, an MPEG-encoded (i.e., compressed) video is broken into fixed-length media segment file (MSF) blocks, and stored distributively on each of the PUs 18. The pointers to all the MSFS 14 are kept in the Sequence Control Brokers (SCB) 16, which are managed by the system manager (SM) 20.

The Sequence Control Brokers (SCB) 16 act on behalf of users to maintain a video playback stream. In the initialization of the video playback session, the SCB 16 fetches the sequence control file (SCF) for the requested movie. During the playback, the SCB 16 sends the read requests to the MSFSs on behalf of the user according to the SCB 16, network traffic characteristics, end user capacity and requirements. The SCB 16 is also responsible for handling virtual VCR function requests, e.g. fastforward, rewind.

The Media Segment File Servers (MSFS) 14 store and retrieve video segment files at the request of the SCBs. The ATM backbone network switch 12 connects the SCBs 16 to the MSFSs 14 of the other PUs 18.

An External Network 22 connects the video server 10 to the end user terminals 24. User terminals 24 may have the following functions: decoding MPEG-encoded video data, providing user interface for virtual VCR function requests and communicating with the SCB 16.

The ATM backbone switch 12 has a limited buffer (e.g. 500 cells). Congestion at the ATM backbone switch 12 occurs when several cells are sent from different output ports to the same PU 18. When two or more cells arrive at the same time to an ATM input port (or a PU), only one cell is read and the others are buffered. If all the buffer cells are full, the other cell transmissions are discarded and considered lost. Even though the ATM maximum bandwidth is 2.25 GBits/sec, this bandwidth can be realized only if, at any time, each output port sends cells to different input ports. On the other end of the spectrum, the ATM bandwidth can be as low as 150 MBits/sec if all the output ports of the fifteen PUs 18 are sending to the same input port of the ATM backbone switch 12. In reality, the achievable ATM bandwidth will be varying between 150 MBits/sec and 2.25 GBits/sec depending on the user request pattern and data layout.

Several simulation experiments have been performed to study the cell losses in the ATM switch 12 and the disk performance. The results of the simulation experiments show that the ATM switch 12 is the bottleneck. As the traffic in the ATM switch 12 increases, the cell losses increase. The present invention provides a data replication layout that makes use of the skewness in the access frequency of popular movies to reduce the traffic in the ATM switch 12.

PanaVISS™ distributes data uniformly among the different PUs 18 and among the different disks. Each movie is divided into segments, called video objects, each of size 64 KBytes. The advantage of the uniform distribution of the movies is that the maximum bandwidth from the I/O system can be achieved. When a user requests a movie, the request is directed by the system manager 20 to one of the PanaVISS Units(PUs) 18, called the hosting PU. The Sequence Control Broker (SCB) 16 at the hosting PU 18 sends read requests, on behalf of the user, to the other PUs 18 to retrieve the different video objects. The Media Segment File Server (MSFS) 12 in each PU 18 retrieves the required data blocks and ships them back to the hosting PU 18 through the ATM backbone 12. Video objects are shipped as a stream of small data cells. Each cell is 53 bytes long (5 bytes header+48 bytes data). Finally, the SCB module 16 in the hosting PU 18 sends the different video objects to the user terminal 24 in the appropriate order. Since there are fifteen PUs 18 in the video server, a large ratio (14/15) of each requested movie goes through the ATM 12. This causes congestion in the ATM and results in data loss.

An example data flow diagram of the above described system is illustrated in FIG. 3 with four PUs 18 being illustrated four simplicity. In FIG. 3, a movie request is sent from the user terminal 24 to the external network 22. The request is then transmitted from the external network 22 to the system manager 20 of the video server 10. The system manager 20 selects one of the PUs 18 to be the hosting PU. In FIG. 3, PU2 has been selected as the hosting PU. The sequence control broker 16 of the hosting PU (PU2) then sends a request via the ATM 12 to the remaining PUs (PU1, PU3 and PU4) to have the media segment file server 14 of each PU to retrieve the video objects corresponding to the requested movie that are stored in that PU. In the example shown one-fourth of the movie is stored in each of the PUs 18. The PUs 18 then send the retrieved video objects or cells via the ATM 12 to the hosting PU (PU2). According to the above description, three-fourths of the requested movie goes through the ATM 12 while the one-fourth of the movie which is stored on the hosting PU (PU2) does not go through the ATM 12.

Figure 2:
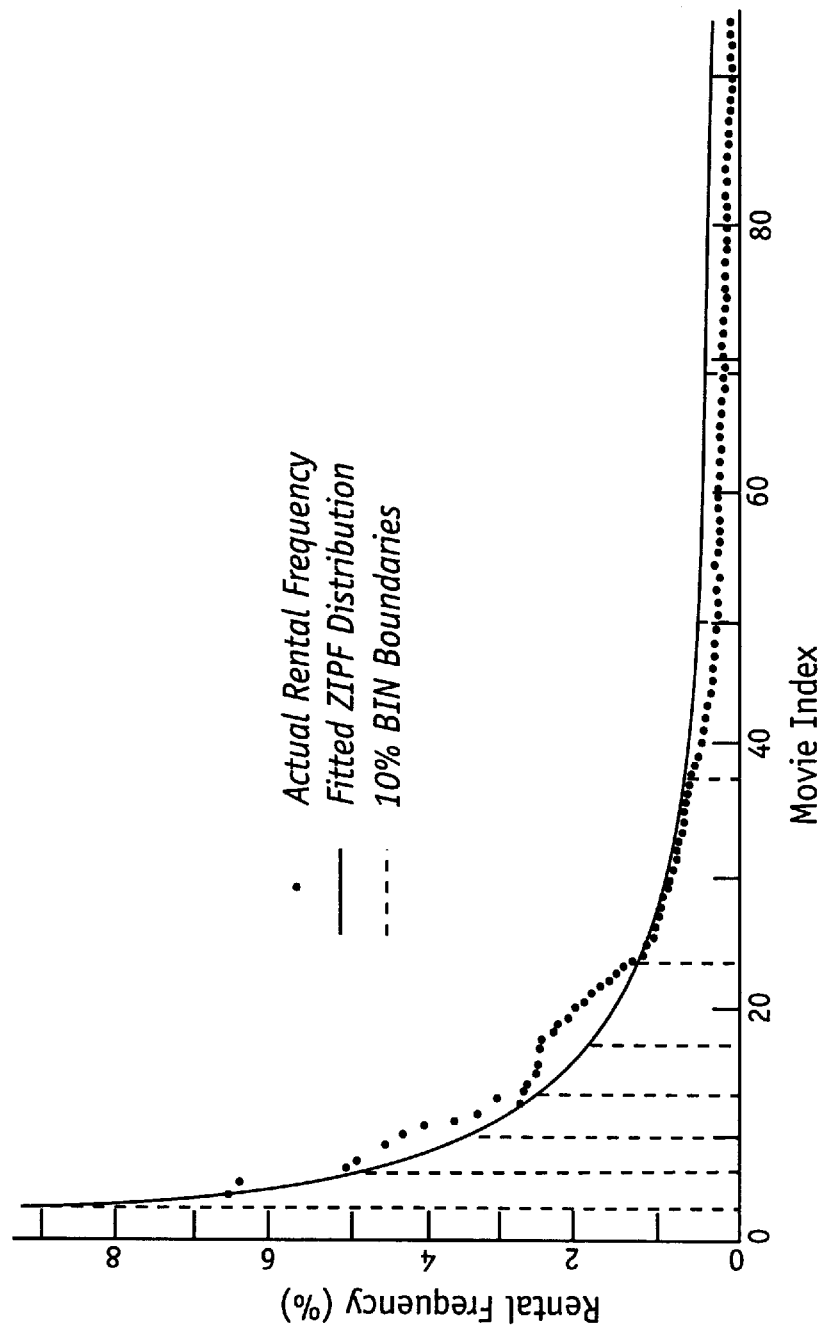
FIG. 2 is a graph illustrating the frequency of video rentals of various movies in a particular week in the video stores.

Movie accesses are far from being uniform. There are very few popular (hot) movies, that a large number of the users request, and many other unpopular (cold) movies. FIG. 2 shows the frequency of rentals for various movies in a particular week in the video stores (Electronic Engineering Times, page 77, March 1993). Movie access frequencies can be approximated by a Zippfian distribution as shown in FIG. 2, see "Human Behavior and Principles of Least Effort: An Introduction to Human Exology" G. Zipf, Addison Wesley, Cambridge, Mass. 1949; "Scheduling Policies for an On Demand Video Server with Batching" Asit Dan, Dinkar Sitaram and Perwez Shahabuddin, In Proc of ACM Multimedia, pages 15–23, San Fran., Calif. 1994. The log-log plot of the Zippfian distribution is a line. The slope of the line a is a parameter that characterizes the distribution. The frequency of rentals of a specific movie can be determined as follow. Movies are sorted according to their access frequencies in decreasing order. Then the frequency $f_j$ of the ith movie is given by $$f_i = \frac{k}{i^{(1-\alpha)}} \quad (1)$$

where k is a normalization constant. The a value for the curve in FIG. 2 is 0.271. (See "Scheduling Policies for an On Demand Video Server with Batching" Asit Dan, Dinkar Sitaram and Perwez Shahabuddin, In Proc of ACM Multimedia, pages 15–23, San Fran., Calif. 1994; "An On-line Video Placement Policy Based On Bandwidth To Space Ratio", Asit Dan and Dinkar Sitaram, In Proc. of ACM SIGMOD, pages 376–385, San Jose, Calif., June 1995.)

The access pattern of the users usually change gradually over time. Thus, statistics about the access or rental frequencies can be collected periodically , e.g., every week. The access or rental frequency of a new movie can be estimated from the access frequency of other similar movies that appeared in the past.

The present invention reduces the traffic that goes through the ATM backbone network 12 to avoid the excessive cell losses due to traffic congestion. In the present invention, the portions of the movie that are stored on the hosting PU 18, called local objects, do not go through the ATM 12. The present invention increases the size of local objects of the requested movies (especially the hot movies) by replicating portions or all of the hot movie on the hosting PU 18. Thus, a hot movie would have two copies. An original copy which was stored when the movie first arrived to the server and a secondary copy, stored on the preferred PU 18, which is created when the movie is identified as a hot movie. A request for this movie can be fulfilled by either retrieving the original copy which is distributed on all of the PUs 18 or the secondary copy which is replicated completely or in large proportion on the preferred PU 18.

The replication scheme of the present invention leads to the following two issues. The first issue is how much bandwidth and space is available on the preferred PU 18. The second issue is what happens when the preferred PU 18 cannot keep up with the incoming requests. At one extreme, if we replicate large portions of several (hot) movies the disk I/O system might get saturated and cannot fulfill the read requests. The scheme should allow graceful degradation in performance when requests can not be fulfilled by the preferred PU, because of the bandwidth limitation.

Before discussing these two issues, several terms will be defined that will be used later.

The number of PUs in the server is $N_{pu}$. The number of disks per PU is Ndisk.

The effective bandwidth of disk i is $BW_{diskj}$.

The required bandwidth and space for movie j are $BW_{moviej}$ and $SZ_{moviej}$.

The access frequency of movie j is $f_j$ which is an estimation of the average number of users requesting movie j.

The bandwidth of a PU ($BW_{pu}$) is defined as the total aggregate bandwidths of all of the disks ($N_{disk}$=16 in the current version of PanaVISS II™) in this PU.

$$BW_{pu} = N_{disk} \times BW_{diskj}$$

The utilized (used) bandwidth at a $PU_k$ is the bandwidth required to satisfy the requests for those movies stored on $PU_k$. The available (unused) bandwidth at $PU_k$ is defined as $$BW_{pu}^{avail} = BW_{pu} - \sum_{j \in moviesonPU} \frac{BW_{moviej} \times f_i}{N_{pu}} \quad (2)$$

The available disk space on PU is $SZ_{pu}$.

The bandwidth utilization $U_{pu}$ of the I/O system at a PU is $$U_{pu} = \frac{BW_{pu} - BW_{pu}^{avail}}{BW_{pu}} \quad (3)$$

For those movies that are considered "hot", a PU 18 is assigned for each movie which is considered the preferred PU 18 for that movie. All the requests for a specific hot movie are redirected to its preferred PU 18. A portion $B_j$ of the movie is replicated on its preferred PU 18. Now, more read requests can be fulfilled from the local disks without going through the ATM. The portion of the movie B that is replicated on a PU 18 is bounded by both the available disk bandwidth and space. A PU 18 can serve as the preferred PU 18 for more than one movie if the input output (I/O) system has enough bandwidth and space. For simplicity, assume that each PU 18 is assigned to one movie. The bandwidth of the portion of the hot movie should be less than the available bandwidth on the PU 18. $B_j$ should satisfy the following two constraints:

$$B_j \leq \frac{N_{pu} \times BW_{pu}^{avail}}{(N_{pu} - 1) \times BW_{moviej} \times f_i} \quad (4)$$

Similarly, the replicated portion of the movie should be less than the available disk space on the preferred PU.

$$B_j \leq \frac{N_{pu} \times SZ_{pu}}{(N_{pu} - 1) \times SZ_{moviej}} \quad (5)$$

If the PU 18 acts as a preferred PU for more than one hot movie, then the available bandwidth/space of that preferred PU 18 is distributed among all of the hot movies stored on that preferred PU 18 according to some distribution, e.g, uniform. The saving in the ATM backbone network traffic $BW_{saving}$ due to the replication can be estimated as $$BW_{saving} = \sum_{\forall movie;playing} \frac{53}{48} \times \frac{N_{pu} - 1}{N_{pu}} \times B_j \times BW_{moviej} \times f_j$$

The frequency of movie requests are predictions collected by monitoring the user pattern over a specific period. As a result, the actual access frequency might be different from the predicted one. Thus, some read requests can not be fulfilled within the time limit because of the long queue (i.e., the disk bandwidth is exhausted.) One solution is that when the disk bandwidth of the preferred PU is exhausted, the preferred PU ignores the secondary copy of the movie and sends read requests to the PUs 18 which contain the original copy of the movie. In this case the data is delivered through the ATM 12 as in the no-replication scheme. Another solution is that once the load on a PU 18 approaches $BW_{pu}$ the System Manager (SM) 20 refrains from treating this PU as a preferred PU and distributes the requests on all of the PUs 18 evenly. In this case the video objects will go through the ATM 12 as in the original design.

Of course the request frequencies of movies change over time. The maintenance of the proposed scheme is simple. When a hot movie becomes unpopular (cold), its secondary copy is removed from the preferred PU 18 and the system manager 20 distributes the requests for that movie uniformly over all of the PUs 18. The freed bandwidth and space in the PU can be used by another hot movie.

Figure 4:
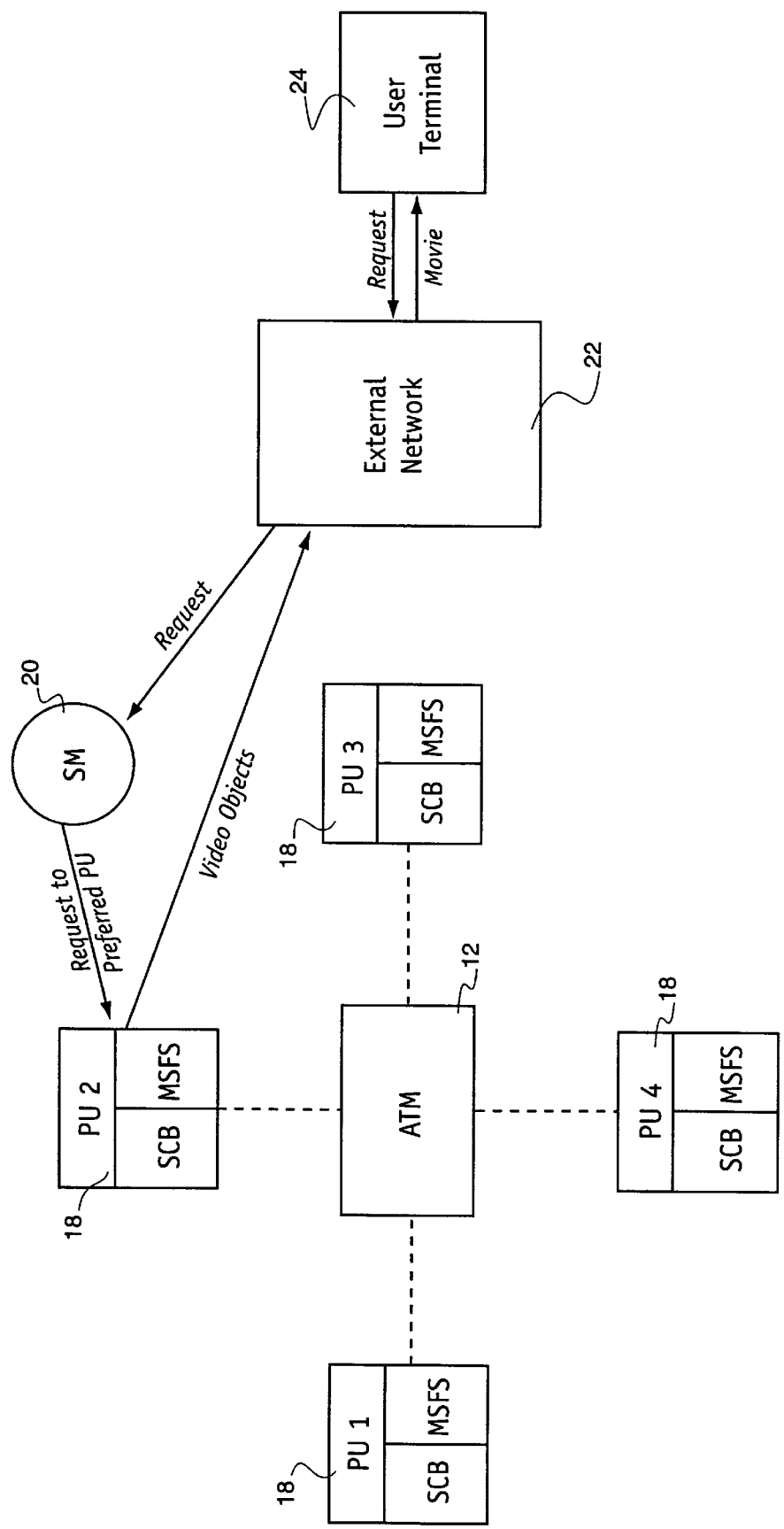
FIG. 4 is a data flow diagram of the replication scheme according to the principles of the present invention.

An example data flow diagram of the system according to the preferred (first) embodiment of the present invention is illustrated in FIG. 4 with four PUs 18 being illustrated four simplicity. In FIG. 4, a movie request is sent from the user terminal 24 to the external network 22. The request is then transmitted from the external network 22 to the system manager 20 of the video server 10. The system manager 20 determines if the movie has been designated as a hot movie and if so transmits the movie request to the preferred PU (here PU2) which stores a complete copy of the requested movie. The sequence control broker 16 of the preferred PU (PU2) then sends the video objects corresponding to the requested movie directly to the external network 22 for transmission to the user terminal 24. According to the above example data flow diagram, none of the requested hot movie goes through the ATM 12 while the all of the movie which is stored on the hosting PU (PU2) goes directly to the user terminal 24 via the external network 22. Thus, congestion in the ATM 12 is greatly reduced since primarily only unpopular movies are transmitted through the ATM 12.

An alternative to the replication scheme described above is to distribute the movie with a skewed distribution as a function of the request frequency of the movie. According to this second embodiment of the present invention, when a movie first arrives, a PU 18 is determined and named as the preferred PU 18 for that movie. A large portion of the movie is assigned to the preferred PU 18. The remaining portion of the movie is distributed evenly among the other PUs 18. Thus, there is only one copy of each movie in the video server 10.

Figure 5:
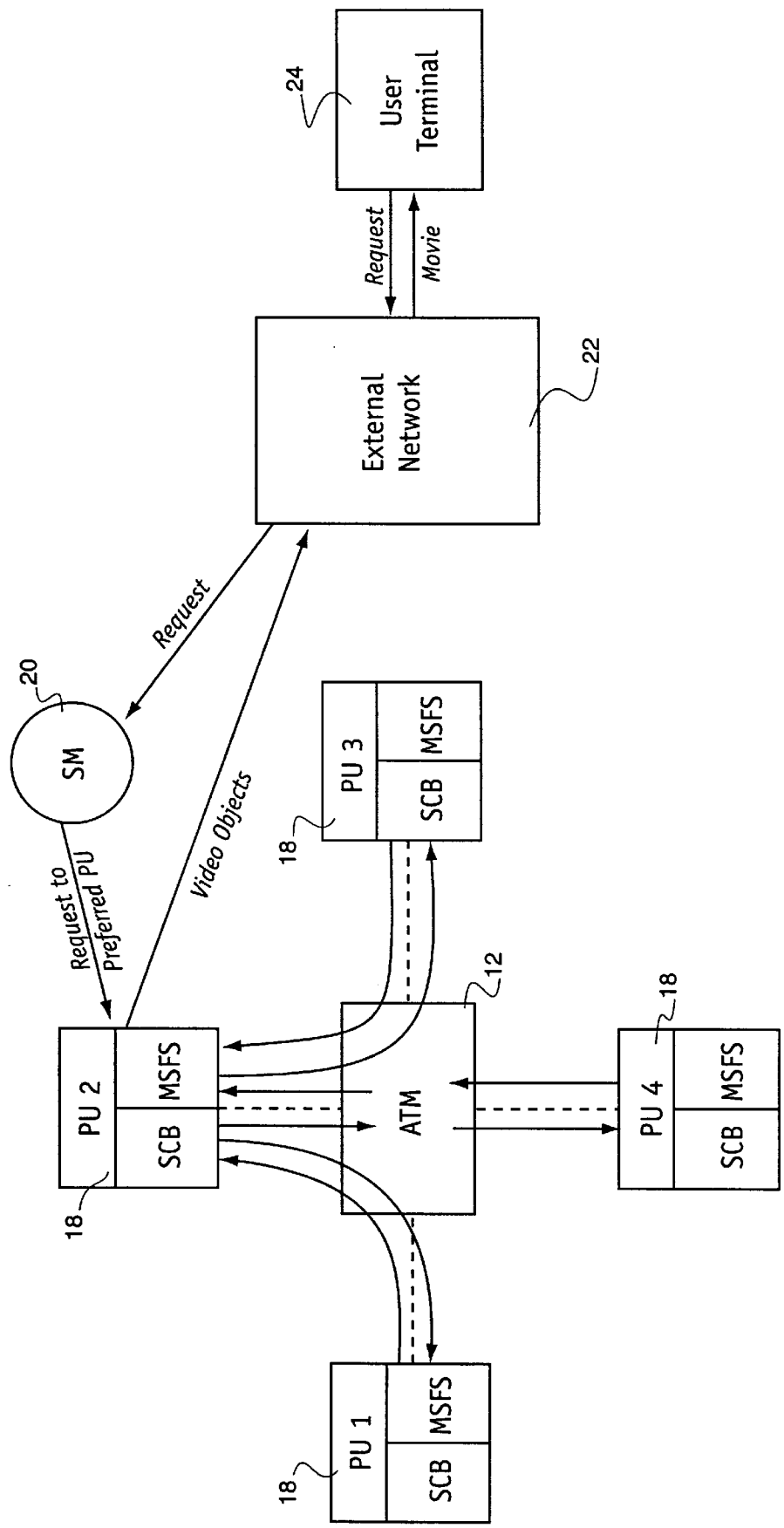
FIG. 5 is a data flow diagram of a replication scheme according to a second embodiment of the present invention.

An example data flow diagram of the system according to a second embodiment of the present invention is illustrated in FIG. 5 with four PUs 18 being illustrated four simplicity. In FIG. 5, a movie request is sent from the user terminal 24 to the external network 22. The request is then transmitted from the external network 22 to the system manager 20 of the video server 10. The system manager 20 determines if the movie has been designated as a hot movie and if so transmits the movie request to the preferred PU (here PU2) which stores a large portion of the requested movie (for example two-thirds). The sequence control broker 16 of the preferred PU (PU2) then sends a request via the ATM 12 to the remaining PUs (PU1, PU3 and PU4) to have the media segment file server 14 of each PU retrieve the video objects corresponding to the requested movie that are stored in that PU. In the example shown one-ninth (the remaining one-third divided by three PUs) of the movie is stored in each of the remaining PUs 18. The PUs 18 then send the retrieved video objects or cells via the ATM 12 to the hosting PU (PU2). According to the above description, one-thirds of the requested movie goes through the ATM 12 while the two-thirds of the movie which is stored on the preferred PU (PU2) does not go through the ATM 12. Thus the congestion in the ATM 12 is reduced.

The maintenance cost of the scheme according to the second embodiment can be much higher than the replication scheme, described above, since the data layout of the movie is a function of the distribution of the request frequencies. As the request frequencies change with time, a costly reorganization of the data needs to be performed. The data reorganization can be performed when there is little or no traffic in the server. Another advantage for the replication scheme, according to the first embodiment is that keeping two copies of the movie increases the availability of the movie, thus, more users can view it simultaneously.

The main cause for the cell losses in the ATM 12 is that the requested movies have to be delivered to the user through the hosting PU 18. Each of the remaining PUs have to send the remaining $$\frac{N_{pu} - 1}{N_{pu}}$$

of the movie, when the uniformity distribution is assumed, to the hosting PU 18.

According to a third embodiment of the present invention, each PU 18 is allowed to send its share of the movie directly to the user without going through the ATM backbone 12 which decreases the traffic in the ATM 12 significantly. To realize this, each PU 18 is provided with an output node 30 on the external network 22, as shown in FIG. 6. When a movie request is received, the system manager 20 assigns a hosting PU 18 for that request. According to the example data flow diagram og FIG. 1, PU1 has been selected as the hosting PU. The hosting PU (PU1) sends requests, on behalf of the user, to other the PUs 18 to fetch the corresponding data blocks. The hosting PU (PU1) is still responsible for sending synchronization signals to the other PUs 18 to send the different frames in the right order. When a PU 18 receives the signal, it sends the data block directly to the user terminals 24 via output node 30. The synchronization signals would be very small in size. Thus, an ATM backbone network 12 with small bandwidth suffices for this job.

Regarding the architecture according to the third embodiment note that, since the different data blocks take different routes through the External Network 22, blocks might arrive at the user site out of order. To avoid this the external network, (see FIG. 1), should guarantee certain delay (jitter) to deliver data blocks. This means that the network delivers data packets in C+$\epsilon$ msec, where C and $\epsilon$ are constants. For more discussion about networks that guarantee the delay see "Real-time Communication in Multiloop Networks" D. D. Kandlur, K. G. Shin, and D. Ferrari, In Distributed Computing Systems, pages 300–307, May 1991; "Supporting Real-time Applications in an Integrated Services Packet Network: Architecture and Mechanism" D. D. Clark, S. Shenker, and L. Zhang, In SIGCOMM '92, pages 14–26, Baltimore, Md., August 1992; "Delay Jitter Control for Real-time Communication in a Packet-switching Network" D. C. Verma, H. Zhang, and D. Ferrari, In IEEE TRICOMM, pages 35–43, Chapel Hill, N.C., April 1991. Now, suppose that block i is stored on $PU_k$ and that block i+1 is stored on $PU_W$. To guarantee that the data arrive to the end user in order, the following algorithm can be used at the video server.

1. the hosting PU sends commands to $PU_k$ and $PU_W$ to retrieve the corresponding blocks.
2. when the data is ready, the PUs send acknowledgments to the hosting PU.
3. the hosting PU sends a command to $PU_k$ to transmit block i through the external network to the user.
4. then the hosting PU waits for at least $\epsilon$ msec before it sends a command to $PU_W$ to transmit block t+1 to the user.

Another solution to the synchronization problem is to have enough buffer at the user terminal to be able to display the video frames in the right order. However, this increases the cost of the user terminal significantly.

The architecture of the third embodiment reduces the importance of the ATM backbone 12 and allows the use of an ATM backbone 12 with small bandwidth. There are also other performance issues regarding the external network 22. Since each PU 18 is allowed to send its share of the movie directly to the user through the ATM network 12, thus, there are $N_{pu}$ different paths for the same request. The routing table, according to this architecture would be $N_{pu}$ times larger than the routing table in the original design. Consequently, the cost of the search in the table increases. On the other hand, the traffic on each route becomes smaller, and thus, better optimization and load distribution is achieved on the ATM network 12 which is translated to better response time.

The present invention provides methods to reduce the traffic on the ATM backbone network 12 in a video server 10 and provides a data replication scheme for the PanaViSST™ video server developed at Panasonic. The preferred embodiment of the invention replicates parts or all of the hot movies on a designated preferred PU 18 to avoid traffic congestion on the ATM 12 and increase the disk utilization at each PU 18. The organization scheme reduces the traffic on the ATM network 12 so that an increased number of the read requests can now be fulfilled from the local disks. Also, alternative design scenarios have been described that reduce significantly the required bandwidth of the ATM backbone 12.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A video server storing a plurality of movies, comprising:

an ATM backbone network; and a plurality of units each including a media segment file server and a sequence control broker, said plurality of units each being connected to said ATM backbone network for communication with one another, wherein each movie stored in said video server is divided into video objects which are stored on each of the units and wherein movies which are determined to be popular movies are also stored to one of said plurality of units such that a number of cells passing through said ATM backbone network is reduced.

2. A video server storing a plurality of movies, comprising:

an ATM backbone network; and a plurality of units each including a media segment file server and a sequence control broker, said plurality of units each being connected to said ATM backbone network for communication with one another, wherein each movie stored in said video server is divided into video objects which are stored on each of the units and wherein movies which are determined to be popular movies also have a large portion stored to one of said plurality of units such that a number of cells, corresponding to said popular movie, passing through said ATM backbone network is reduced.

3. A video server storing a plurality of movies, comprising:

an ATM backbone network; and a plurality of units each including a media segment file server and a sequence control broker, said plurality of units each being connected to said ATM backbone network for communication with one another, wherein each movie stored in said video server is divided into video objects which are stored on each of the units and wherein movies which are determined to be popular movies are distributed among said plurality of units with a large portion stored to one of said plurality of units and a remainder stored on remaining units of said plurality of units, such that a number of cells, corresponding to said popular movie, passing through said ATM backbone network is reduced.

* * * * *